Patented Dec. 3, 1940

2,223,777

UNITED STATES PATENT OFFICE 2,223,777

METAL CATALYST AND ITS PREPARATION

Otto Beeck and Frederick F. Rust, Berkeley, Calif., assignors to Shell Development Company, San Francisco, Calif., a corporation of Delaware No Drawing. Application August 16, 1938, Serial No. 225,186

14 Claims. (Cl. 252—222)

The present invention relates to new and useful catalytic materials. More particularly, the invention relates to new and useful metal films having exceptionally high catalytic activity, and to a method for their preparation.

An object of the invention is to provide condensed metal films having unusually high catalytic activities. Another object of the invention is to provide condensed catalytic metal films which are exceedingly active even at low temperatures. Another object is to provide condensed catalytic metal films of a new type which are not dependent upon sorbed gas for their activity. A further object is to provide certain condensed catalytic metal films which, in spite of their extraordinary activity, are relatively little affected by the usual catalyst poisons. Still a further object of the invention is to provide a method whereby these new catalytic films may be prepared in a simple, reproducible, and practical manner. Other objects of the invention will be apparent in the following description.

In studies of the characteristics of metal surfaces, thin metal films have been prepared by condensing evaporated metal, as well as cathodically sputtered metal, on cooled surfaces under diminished pressure. Those produced by cathodic sputtering have, as a rule, proved to be relatively poor catalysts although, in a few cases, individual films have been prepared which have shown some activity. A few of the films prepared by cathodic sputtering have shown a certain amount of orientation. The catalytic activity sometimes found in cathodically sputtered films has been found to bear no relation to the orientation sometimes noticed and is probably due to the promoting action of sorbed gas in the film.

Films produced by condensing evaporated metal on cooled surfaces, on the other hand, when prepared under certain conditions have been found, in general, to be more active catalytically. It has been found that the catalytic activity of these films is due to the promoting action of certain sorbed gases, the catalytic activity being appreciable only when the quantity of sorbed gas is within a very narrow range. These films, since their catalytic activity is dependent upon the promoting action of sorbed gases, are relatively unstable and easily spoilt. For example, they lose almost all of their activity by simply subjecting them to a high vacuum for a short time. These films are, furthermore, difficult to produce on any more than a small laboratory scale since they require the use of liquid air cooling and high vacua, and they are consequently not suited for commercial use.

We have found that by condensing metal vapors, produced by monoatomic evaporation of appropriate metals, on a cooled surface under certain conditions, a new type of metal film having extraordinary high catalytic activity may be prepared. The catalytic metal films of the present invention differ from all previous metal films in that they are considerably more active; their catalytic activity is not dependent upon the promoting action of sorbed gases; their microscopic surface is different and characteristic; and they are all characterized by a definite and characteristic orientation of the crystallites.

Macroscopically considered, our new catalysts are thin metal films of a dark to almost jet black color entirely uncharacteristic of the metal. Microscopically considered, investigations indicate that the catalytically-active surface is composed of innumerable spire-like prominences of a height considerably greater than the diameter.

Electron diffraction studies of our new catalytic films have shown that in all cases the crystallites of our catalytically active films are highly (in many cases, almost perfectly) oriented. It has been found that the catalytic activity of the films is directly related to the nature and degree of orientation. The interrelation of the degree of orientation, the type of electron diffraction pattern, and catalytic activity is shown in the Table I in which column 1 gives the types of electron diffraction patterns given by the films, column 2 gives the degrees of orientation expressed by an arbitrary scale, and column 3 gives the catalytic activities of the films.

*Table I*

| 1<br>Pattern | 2<br>Orientation | 3<br>Activity |
|---|---|---|
| Pure rings | "Completely unorientated" | Entirely or almost inactive. |
| Rings with faint arcs | "Slightly oriented" | Slight activity. |
| Rings and arcs | "Moderately oriented" | Moderate activity. |
| Arcs with faint rings | "Well oriented" | Good activity. |
| Extended arcs | "Highly oriented" | High activity. |
| Dots | "Almost perfectly oriented" | Exceptionally high activity. |

Although, in view of the difficulty of expressing the degree of orientation in a more definite manner, the above data cannot be accurately plotted, the shape of the curve is known to be such that if the activity is measured on the ordinate and the degree of orientation measured on the abscissa the slope of the curve in the region of low activity and slight orientation is relatively gentle and rapidly increases as the degree of orientation approaches perfection. Thus, for example, the difference in activity, expressed in terms of an arbitrary activity rate constant, between "slightly" and "moderately" oriented films is usually about 6 to 15, whereas the difference between "highly oriented" and "almost perfectly oriented" films (extended arcs and dot electron diffraction patterns) is usually about 100 to 180. The films prepared according to the present invention are all at least "well oriented," i. e., they all have an orientation at least sufficient to give an electron diffraction pattern consisting of arcs with faint rings.

The activity of the present catalytic metal films is not only dependent upon the degree of orientation, but also upon the type of orientation. We have found that when catalytic metal films are prepared according to the present invention the condensing metal atoms tend to take positions as far apart as possible. Thus, with metals having a face-centered cubic lattice, such as nickel, the (110) plane is oriented approximately parallel to the macroscopic surface, while with metals having a body-centered cubic lattice, such as iron, the (111) plane assumes this orientation. This method of deposition results in the formation of films in which the microscopic surface is composed predominantly of the most active crystal planes, i. e., those planes of the crystallites which contain the least number of metal atoms.

The catalytic films of the present invention are exceedingly active, being, in fact, far more active than any metal catalysts hitherto reported. The very high activities of our metal catalyst films are explained by the fact that the exposed microscopic surfaces of the films are composed predominately of the most active planes of the crystallites. Although we do not desire our invention to be limited by the soundness or accuracy of any theories advanced to explain the advantageous results obtained, it appears that the exposed crystal planes of the present oriented crystallites owe their high catalytic activity to the lower energy required for activated adsorbtion on these planes. In the case of nickel crystals, for example, the (110) plane, which contains many more pairs of atoms separated by the larger atom-atom distance (3.51 Å.), the activation energy for the adsorbtion of hydrogen is much lower than for the other crystal planes. In order to facilitate comparison all activities given hereinafter are expressed in terms of the true activity constant $\times 100/2.303$ for the reaction of stoichiometric quantities of hydrogen and ethylene at 0° C., and are based on determinations made at this temperature. The activity constants on this same basis, measured at 25° C. would be roughly five times as large. Catalytic films having activities of about 95 may, for instance, be very easily prepared. In films of this activity each metal atom of the surface is capable of hydrogenating over 1000 ethylene molecules per second at 0° C. and under diminished pressure. We have prepared numerous films according to the present invention having activities in the order of 300. Although catalytic films having much higher activities than this may easily be prepared, this is about the highest activity that could be measured with any degree of accuracy. In order to determine activity constants of this order of magnitude special conditions, such as, for example, violent agitation of the reactants to avoid diffusion effects, must be maintained. The catalytic activity of the present films depreciates gradually with use in much the same manner as the ordinary well known catalysts. The activities are substantially unaffected by heating to moderate temperatures or by thorough evacuation. The orientation, and hence the activity, is destroyed upon sintering the crystallites at high temperature.

The present catalytic metal films may be prepared from any of the metals of the eighth group of the periodic system of the elements. These metals, which are Fe, Co, Ni, Ru, Rh, Pd, Os, Ir and Pt, are known to be active catalysts for a great number of organic and inorganic reactions such as, for example, hydrogenation, dehydrogenation, isomerization, oxidation, hydrocarbon cracking, etc. Our new metal film catalysts may, in general, be substituted with advantage for any of these previously used metals in any of the reactions in which these metal catalysts have previously been employed, except perhaps, in certain reactions requiring very high temperatures. By the use of the present catalysts these reactions may generally be executed at a lower temperature and under more favorable equilibrium conditions; the catalyst cost can in many cases be reduced; and the yield per unit of equipment may be materially increased.

From the above, it is seen that our new catalysts which may be defined as catalytically active metal films consisting substantially of one or more metals of the eighth group of the periodic system of the elements in which the microscopic surface is composed predominately of the most active planes of the crystallites, are new and highly desirable catalysts having definite and distinct characteristics. These characteristic films may be prepared by condensing vapors of a metal (produced by monoatomic evaporation of an appropriate metal) upon a cooled and suitably prepared surface in the presence of a residual gas under certain prescribed conditions. The degree of the orientation (catalytic acivity) of the present catalyst films is affected by the metal used, concentration (pressure) of residual gas, method of evaporating the metal, distance between the source of metal vapors and the condensing surface, nature of the condensing surface, temperature of the condensing surface, and the thickness of the catalyst film.

Since the catalytic activity of the films is dependent upon the orientation of the crystallites therein, the present catalysts are restricted to those metals which are able to exhibit such orientation. We have found that catalytically active films may be prepared from the metals of the eighth group of the periodic system of the elements, viz., Fe, Co, Ni, Ru, Rh, Pd, Os, Ir, and Pt. Although films consisting substantially of one metal are the easiest to prepare and perhaps the most useful, catalytic films containing a plurality of metals may be prepared by utilizing appropriate alloys or by utilizing a plurality of sources of metal vapor. For example, excellent films may be prepared from nickel containing small quantities of iron, cobalt or manganese. Some particular characteristics of the catalytic films produced from individual metals will be described later.

We have found that in order to produce the present highly oriented films it is essential that the metal vapors strike the condensing surface substantially in the atomic state. Any source of metal vapors affording a sufficient vapor pressure of atomic (non-ionized) vapors, such as, for example, by purely thermal evaporation may be used. One convenient method affording excellent control by which metals may be thermally evaporated is by passing a suitable electric current through a filament of the desired metal. In such cases as with platinum and palladium, for instance, where the vapor pressure is quite low even at the melting point, the metal may be attached to a low vapor pressure high melting filament and the evaporation carried out as usual.

We have found that the temperature at which the condensation of the metal vapor is effected has a great influence on the character of the film. If the surface upon which the condensation takes place is maintained at very low temperatures the depositing metal film has the property of taking up gas (known as sorbed gas). This is true even if the film is deposited under very high vacuum such as, for example, $10^{-6}$ mm. The presence of sorbed gas exerts a profound effect upon the character of the film. It tends to prevent the natural crystallization of the film, prevents the desired orientation of the crystallites, lowers the electrical conductivity of the film, and when the concentration of the sorber gas in the film is within a certain very narrow range promotes the catalytic activity of the film. When the condensation of the metal vapor takes place on a surface held at a higher temperature, for example, at 0° or room temperature, on the other hand, the tendency of the film to sorb gas is substantially lost and an entirely different type of film is produced. Films produced in this manner, other conditions being favorable, are found to be substantially devoid of any appreciable quantities of sorbed gas, highly oriented in the desired manner, and highly active. We have found that, in general, the best oriented films (and, hence, most active films) may be prepared by effecting the condensation on a surface maintained at about from —5 to about +30° C. Although desirable films may be prepared at temperatures as low as about —30° C. and as high as about 100° C. the catalytic activity of films prepared at —30° C., for example, are noticeably less active than those prepared in the preferred temperature range. This is shown, for example, in Table II wherein column 1 gives the temperature of the condensing surface and column 2 gives the relative catalytic activity of the film taking the activity of films prepared at 23° C. as unity.

*Table II*

| 1 Temperature, °C. | 2 Activity |
| --- | --- |
| —80 | No orientation |
| —30 | .21 |
| +2 | 1.42 |
| +10 | 1.22 |
| +23 | 1.00 |
| +50 | 0.80 |
| +90 | 0.58 |

We have found that the degree of orientation of our new catalytic films is dependent upon the thickness of the films, the orientation becoming more nearly perfect as the film thickness increases. Very thin films, even when prepared under the most favorable conditions are not appreciably oriented and do not compare in catalytic activity with the more active films. Only after the films reach a certain thickness, dependent upon the cleanliness of the supporting surface and somewhat upon the particular metal in question, does the orientation become significant. As the degree of orientation increases with the film thickness the catalytic activity increases rapidly until a very high degree of orientation is reached, from which point on the catalytic activity of the film increases at the maximum rate almost linearly with the film thickness. The linear increase in catalytic activity with increasing film thickness occurring after a very high degree of orientation is reached (about 3000 atoms in the case of nickel films prepared under favorable conditions) is due to some extent to a further perfection of the orientation but is due chiefly to the increase in the microscopic surface of the film. We have found that as the film thickness increases and orientation becomes pronounced the condensing metal atoms no longer deposit in their usual manner but tend to build up spire-like prominences. The result of this method of deposition is that the microscopic surface (and hence, the activity) increases linearly with the increase in film thickness and does not reach a limit at a point where the total supporting surface is covered with metal atoms as would be the case if the deposition did not take place predominately on the tops of the spire-like prominences.

The increase in the orientation of the films as the thickness increases can be seen by the electron diffraction patterns given by comparable films of different thicknesses. The relation of the activity and film thickness for a comparative set of nickel films prepared on a well "baked out" support is shown in Table III wherein column 1 gives the thickness of the films expressed as milligrams of nickel per 30 cm.$^2$ macroscopic surface, column 2 gives the approximate average thickness of the films in atoms of nickel, and column 3 gives the activity constant.

*Table III*

| 1 Thickness (mg.) | 2 Thickness (atoms) | 3 Activity |
| --- | --- | --- |
| 0 | 0 | 0 |
| 1 | 210 | 4 |
| 2 | 420 | 8 |
| 4 | 850 | 14 |
| 6 | 1270 | 22 |
| 8 | 1700 | 31 |
| 10 | 2120 | 42 |
| 14 | 2970 | 72 |
| 20 | 4200 | 130 |
| 30 | 6360 | 205 |
| 40 | 8480 | 262 |

The increase in activity seen in column 3 of Table IV in the range of about 0 atom to about 3000 atoms thickness is due primarily to the degree of orientation; the almost linear increase occurring when the film is above about 3000 atoms thick is due primarily to the increase in microscopic surface of the film, due to the building up of the spire-like prominences.

The tendency for orientation to set in only after the film has reacted a certain thickness appears to be due to an inhibiting action of even very small amounts of gas adsorbed on the supporting surface, which inhibiting action diminishes as the film thickness increases. It is, therefore, important, if the best films are to be prepared, to "bake out" the supporting surface prior to use. A suitable "baking out" treatment consists in heating the otherwise clean glass, quartz, or other suitable surface at an elevated temperature, for example, 350° C., under vacuum. The inhibiting action of an "unclean" surface may be overcome, however, and desirable films prepared without first "baking out" the supporting surface (or giving only a very slight "baking out") by simply continuing the deposition until the films are sufficiently thick. Thus, for example, fairly thin nickel films, about 1000 atoms thick, deposited under 1 mm. on an un-baked out support are inactive and give a diffuse ring electron diffraction pattern. If the deposition is continued, however, until the film is about 2500 atoms thick the electron diffraction pattern is found to consist of extended arcs. Furthermore, while nickel films, prepared under favorable conditions on a well "baked-out" support show a good orientation when only 500 atoms thick, comparable films prepared on "unbaked-out" supports or poorly "baked-out" supports reach an equivalent degree of orientation only at much greater thicknesses. Thus, for example, while the increase in activity with increased film thickness becomes linear (i. e., "almost perfect orientation" is reached) in the case of nickel films (prepared under about 1 mm. of gas pressure on a support "baked out" at 350° under vacuo for about one hour) when the film thickness reaches about 3000 atoms thick, an equivalent degree of orientation is only reached when the film is about 12,000 atoms thick when deposited under comparable conditions on an "unbaked-out" support.

Since the preparation of very thick films consumes more time and films deposited on "baked out" surfaces are appreciably more active per given film thickness, it is preferable to properly "bake out" the surface before condensing the film. The effect of "baking out" on the activity of the resultant film is shown in Table IV wherein column 1 gives the conditions under which supports were "baked out" under vacuo and column 2 gives the comparative activity of films of equal thicknesses deposited thereon:

*Table IV*

| 1<br>Temperature, °C. | 2<br>Activity |
| --- | --- |
| 0 for 1 hour | 0.44 |
| 150 for 1 hour | 0.53 |
| 240 for 1 hour | 0.78 |
| 350 for 1 hour | 1.00 |
| 500 for 1 hour | 1.00 |
| 350 for 5 hours | 1.20 |

The minimum film thickness at which oriented film may be obtained not only depends upon the "cleanliness" of the supporting surface, but to some extent upon the particular metal in question. As was previously shown, nickel films prepared under favorable conditions on a well "baked out" support should be at least 500 atoms thick. With iron, on the other hand, oriented films may be prepared having a minimum thickness of only 250 atoms. Likewise, platinum films prepared under very favorable conditions may be fairly well oriented when only 500 atoms thick. These minimum thicknesses, it should be understood, represent the minimum thickness at which "well oriented" films may be prepared under otherwise optimum conditions. Films 3000 atoms thick or over are, of course, much superior.

Another factor of great importance in the preparation of the present oriented films is the pressure of foreign gas under which the condensation of the films takes place. We have found that the presence of a foreign gas strongly induces the formation of oriented films. Unlike films dependent upon foreign gas for their activity, the activity of the present oriented films is not dependent upon the use of one or two particular gases. In general, any inert gas such as $N_2$, $H_2$, He, A, Kr, Xe, hydrocarbon vapors and the like is applicable for the preparation of our catalytic films. The noble gases, especially argon, have a very strong orienting effect. Nitrogen, although not quite as efficient, is inexpensive, easy to obtain, pure and gives excellent results. Oriented films may be prepared in oxygen or air according to the present invention, but the films so produced, unlike those prepared under high vacuum and at a very low condensation temperature, consist to an appreciable extent of the metal oxide. Since the oriented metal oxide films only reach their full activity after a considerable induction period, the films are preferably prepared in an atmosphere substantially free of oxygen. In certain cases we have found water vapors to be harmful. This is apparently due to the fact that water vapors, when present in appreciable quantities, may, in some cases, react with the nickel to form metal oxides or hydroxides.

We have found that films produced under high vacuum ($10^{-4}$ mm. or less) are practically un-oriented and that as the pressure is increased the orientation becomes more perfect until a pressure is reached at which the orientation is practically perfect and a further increase in pressure is without appreciable effect. The optimum pressure at which a high degree of orientation may be produced depends somewhat upon the particular metal in question and varies from about 1 mm. in the case of nickel films to about 3 mm. in the case of platinum films. Although films prepared under a pressure of foreign gas at least equal to the optimum pressure are much more active per given film thickness than films prepared under lower pressures, very desirable films having good activity may be prepared at pressures as low as 0.01 mm., or in some cases, even as low as 0.001 mm. if prepared sufficiently thick (at least 3000 atoms). The beneficial effect of a foreign gas is clearly shown in Table V wherein column 1 gives the prevailing pressures of $N_2$ and column 2 gives the activity constants of the corresponding films.

*Table V*

| 1<br>Pressure<br>(mm. $N_2$) | 2<br>Activity of films<br>(6000 atoms thick) |
| --- | --- |
| 0.00001 | 10 |
| 0.05 | 140 |
| 1.0 | 205 |
| 3.0 | 205 |
| 10.0 | 205 |

As can be seen from Table V, nickel films prepared under higher pressures are as active as those prepared under the optimum pressure of 1 mm. In the practical preparation of these films, however, these higher pressures are not as desirable since as the pressure increases the rate of deposition of the films is lowered. Thus, for example, under otherwise comparable conditions, nickel films may be deposited about six times as fast under 1 mm. as under 10 mm. pressure. Furthermore, the evaporation of the metal from a filament is more difficult at higher pressures, especially in the case of cobalt where the filament must be heated to near the melting point.

In Table V the dependence of the catalytic activity upon the prevailing gas pressure for films of equal thickness is shown. The catalytic activity of the films, after a certain thickness which is dependent upon several factors has been reached, has been shown to be almost a linear function of the film thickness. Another important effect of the pressure of foreign gas present is its effect upon the relation of the film thickness and catalytic activity. We have found that at low gas pressures the increase in activity with film thickness is quite small and increases as the optimum pressure is approached. This is shown for nickel films deposited on a well baked out support, for example, in Table VI, wherein the left column gives the prevailing gas pressures and the right column gives the comparative rates of increase in activity per given increase in film thickness.

Table VI

| 1 Pressure (mm.) | 2 Comparative rate of increase in activity per given increase in film thickness |
|---|---|
| 3 | 76 |
| 1 | 76 |
| .05 | 52 |
| .001 | 16 |

Another factor affecting the practical preparation of our new films and to some extent the orientation thereof is the distance between the source of the metal vapors and the condensing surface. At any given pressure this distance is preferably kept sufficiently short that the metal vapors leaving their source are not allowed to cool sufficiently to cause them to condense to any appreciable extent to form masses of metal before striking the condensing surface. When the prevailing pressure is near the lower limit this distance may be quite large, and, on the other hand, if this distance is made relatively short the films may be deposited under quite high pressures. In general, due to the higher rate of deposition allowed, this distance is preferably kept relatively short (2-50 mm.) even when the prevailing pressure is near the lower limit.

Of the various metal films of the present invention those of iron are perhaps the easiest to prepare. We have found that iron films even as thin as about 250 atoms are "well oriented" if prepared under optimum conditions, and are slightly more active than nickel films of equal thickness. In thicker films, however, nickel films are about three times more active.

Palladium films prepared according to the present invention are very desirable catalysts but behave somewhat differently than films of the other metals of the eighth group of the periodic system. This difference in behavior is apparently due to the property of palladium of absorbing hydrogen throughout its mass. When palladium films are used to hydrogenate an olefine, for example, in the presence of an excess of hydrogen, the reaction is initially rapid and this drops to a low rate. When the excess hydrogen is used up the reaction again takes place rapidly. When using palladium films as hydrogenation catalysts it is, therefore, desirable, in general, to avoid an excess of hydrogen. This peculiar behavior of the present palladium films may be overcome, however, if the reactants are circulated sufficiently fast. Aside from their unusual activity (2.5 times that of corresponding nickel catalysts) the present palladium films are very stable, have a long life, and are relatively immune to the usual catalyst poisons.

Cobalt films may be prepared by flattening cobalt cubes into thin strips and utilizing these strips as filaments through which sufficient current is passed to vaporize the metal. For the preparation of catalytic cobalt films, the films are preferably condensed under a pressure of foreign gas between about 0.01 mm. and 2 mm. and the deposition continued until the film is preferably over 1000 atoms thick.

Platinum films prepared according to the present invention are very desirable catalysts. Platinum films are, in general, preferably condensed under a somewhat higher gas pressure than, for instance, those of nickel, or iron. Thus, for example, while iron film 2000 atoms thick deposited under .05 mm. $N_2$ are well oriented platinum films prepared under the same conditions are not. However, platinum films prepared under 1 mm. $N_2$ pressure are fairly well oriented even at a thickness of only 500 atoms. In such thin oriented films of platinum we have found the orientation to be predominately (211) orientation while in thicker films (111) orientation predominates.

While we have in the foregoing described in some detail the preferred embodiment of our invention and some variants thereof, it is to be understood that we do not desire our invention to be limited by the soundness or accuracy of theories which we have advanced as to advantageous results obtained, and that it is our intention to claim all novelty herein disclosed as broadly as possible in view of the prior art.

We claim as our invention:

1. A process for the production of a catalytic palladium film which comprises monomolecularly vaporizing palladium under a pressure of a foreign oxygen-free gas greater than 0.01 mm., and condensing said metal vapors at a temperature between —5° C. and +30° C. until the deposited palladium film is at least 250 atoms thick upon a support previously baked out at a high temperature under vacuum.

2. A process for the production of a catalytic palladium film which comprises monomolecularly vaporizing palladium under a pressure of a foreign oxygen-free gas greater than 0.01 mm., and condensing said palladium vapors upon a support held at a temperature in the range of from about —30° C. to about 100° C.

3. A process for the production of a catalytic nickel film which comprises monomolecularly vaporizing nickel under a pressure of a foreign oxygen-free gas greater than 0.001 mm., and condensing said nickel vapors upon a support held at a temperature in the range of from about —30° C. to about 100° C.

4. A process for the production of a catalytic iron film which comprises monomolecularly vaporizing iron under a pressure of a foreign oxygen-free gas greater than 0.001 mm., and condensing said iron vapors upon a support held at a temperature in the range of from about —30° C. to about 100° C.

5. A process for the production of a catalytic metal film which comprises monomolecularly vaporizing a metal of the eighth group of the periodic system of the elements under a pressure of a foreign oxygen-free gas greater than 0.001 mm., and condensing said metal vapors upon a support held at a temperature in the range of from about −30° C. to about 100° C. until the deposited metal film is at least 250 atoms thick.

6. A process for the production of a catalytic metal film which comprises monomolecularly vaporizing a metal of the eighth group of the periodic system of the elements under a pressure of a foreign oxygen-free gas greater than 0.001 mm., and condensing said metal vapors at a temperature between −30° and +100° C. upon a support previously baked out at a high temperature under vacuum.

7. A process for the production of a catalytic metal film which comprises monomolecularly vaporizing a metal of the eighth group of the periodic system of the elements under a pressure of a foreign oxygen-free gas greater than 0.001 mm., and condensing said metal vapors upon a support held at a temperature in the range of from about −5° C. to about 30° C.

8. A process for the production of a catalytic metal film which comprises monomolecularly vaporizing a metal of the eighth group of the periodic system of the elements under a pressure of a foreign oxygen-free gas greater than 0.01 mm., and condensing said metal vapors upon a support held at a temperature in the range of from about −30° C. to about 100° C.

9. A process for the production of a catalytic metal film which comprises monomolecularly vaporizing a metal of the eighth group of the periodic system of the elements in the presence of an oxygen-free gas under a pressure between about 0.001 mm., and 10 mm., and condensing said metal vapors upon a support held at a temperature in the range of from about −30° C. to about 100° C.

10. A process for the production of a catalytic metal film which comprises monomolecularly vaporizing a metal of the eighth group of the periodic system of the elements under a pressure of an inert gas greater than 0.001 mm., and condensing said metal vapors upon a support held at a temperature in the range of from about −30° C. to about 100° C.

11. The product prepared according to claim 2.
12. The product prepared according to claim 3.
13. The product prepared according to claim 4.
14. The product prepared according to claim 10.

OTTO BEECK.
FREDERICK F. RUST.